United States Patent [19]
Chan et al.

[11] Patent Number: 5,411,290
[45] Date of Patent: May 2, 1995

[54] HYBRID INFLATOR

[75] Inventors: Sek K. Chan, St Bruno, Canada; Steven J. Graham, Ayrshire, Scotland; Ian J. Kirby, Ayr, Scotland; Graeme A. Leiper, Ayrshire, Scotland

[73] Assignees: Imperial Chemical Industries PLC, London, England; ICI Canada, Inc., North York, Canada

[21] Appl. No.: 26,128

[22] Filed: Mar. 4, 1993

[30] Foreign Application Priority Data

Mar. 4, 1992 [GB] United Kingdom ............... 9204712

[51] Int. Cl.⁶ .......................................... B60R 21/26
[52] U.S. Cl. ........................... 280/737; 280/741; 422/166; 222/3
[58] Field of Search ............ 280/736, 737, 740, 741, 280/728 R; 102/530, 531; 149/14, 15, 19.3; 422/164, 165, 166; 222/3

[56] References Cited

U.S. PATENT DOCUMENTS

| | | | |
|---|---|---|---|
| 3,256,819 | 6/1966 | Leeper | 102/531 |
| 3,721,456 | 3/1973 | McDonald. | |
| 3,781,456 | 12/1973 | Knowles et al. | |
| 3,813,007 | 5/1974 | Doin et al. | |
| 3,834,729 | 9/1974 | Oka et al. | 280/737 |
| 3,966,226 | 6/1976 | Roth | 280/737 |
| 3,995,559 | 12/1976 | Bice et al. | 149/19.3 |
| 4,275,657 | 6/1981 | Dallet | 102/531 |
| 5,230,532 | 7/1993 | Blumenthal | 280/741 |

FOREIGN PATENT DOCUMENTS

| | | | |
|---|---|---|---|
| 2116782 | 7/1972 | France. | |
| 4116882 | 12/1992 | Germany | 280/741 |
| 1369807 | 9/1971 | United Kingdom. | |
| WO90/010724 | 9/1990 | WIPO. | |
| WO90/16611 | 9/1990 | WIPO. | |

Primary Examiner—Karin L. Tyson
Attorney, Agent, or Firm—Cushman, Darby & Cushman

[57] ABSTRACT

A hybrid inflator for a gas bag safety restraint system for use in a motorized vehicle comprises a compressed supply of stored gas heated by means of a gasless pyrotechnic material in sheet form. The sheeted pyrotechnic material may advantageously be located within the compressed gas storage vessel in a thin container or in direct contact with the gas. The invention also includes a heating element for a hybrid inflator. The preferred pyrotechnic material comprises a substrate of an oxidizing polymeric material for example, polytetrafluoroethylene (PTFE), coated with an oxidizable material, for example magnesium, which is capable of reacting exothermally with the oxidizing polymeric material. The pyrotechnic sheet produces solid products in very fine particle form which gives improved energy transfer to the stored gas. The invention facilities simple, cheaper constructions of hybrid inflators.

10 Claims, 3 Drawing Sheets

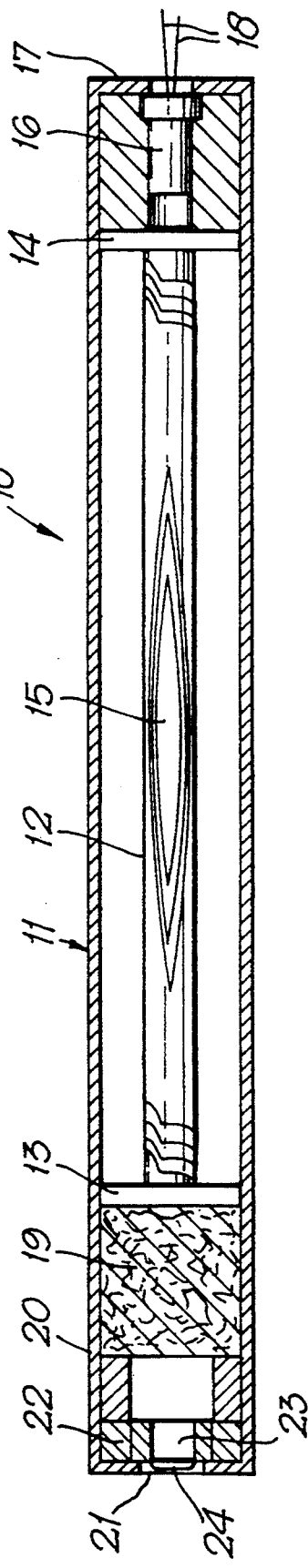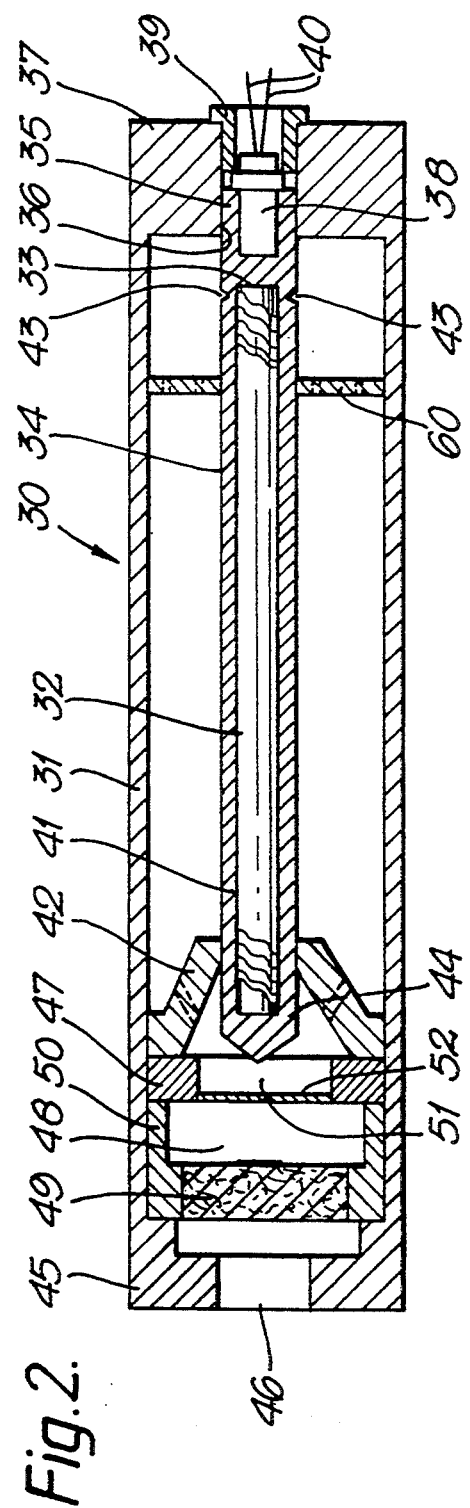

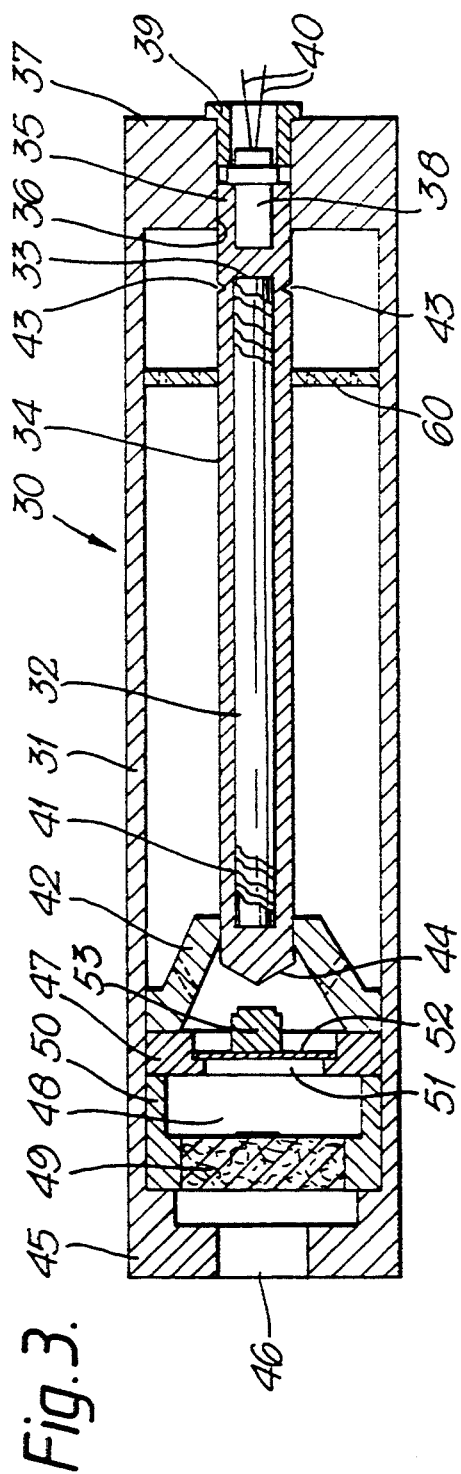
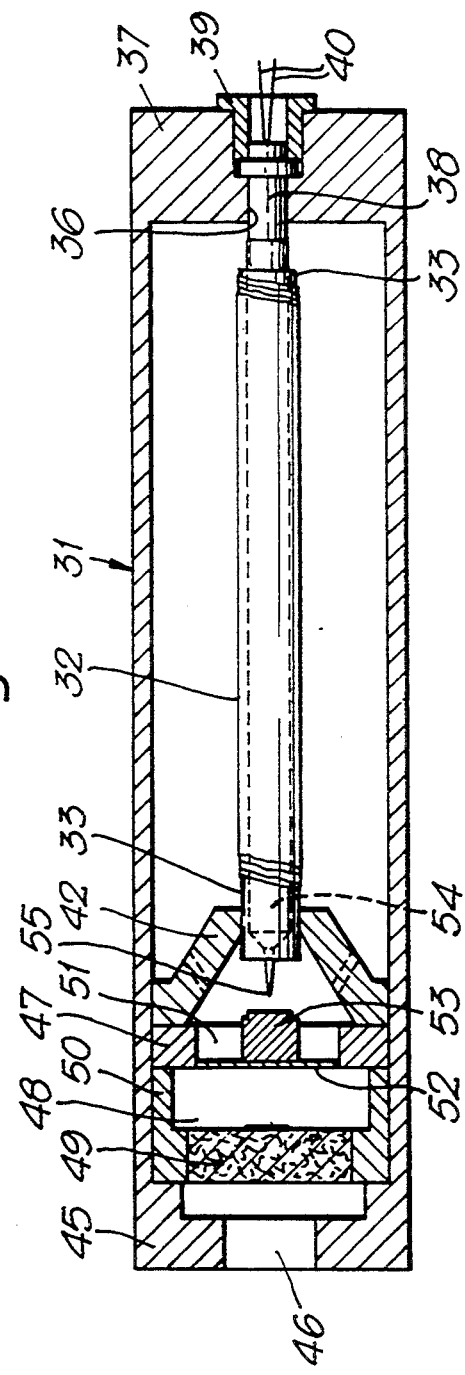
Fig. 3.
Fig. 4.

HYBRID INFLATOR

FIELD OF INVENTION

This invention relates to a hybrid inflator of the kind used to inflate an occupant restraint cushion or bag in safety apparatus in motorised vehicles when the vehicle is arrested in a collision. The invention also includes a heating element for a hybrid inflator.

BACKGROUND OF THE INVENTION

Gas bags in restraint systems are inflated by gas from a stored supply of inert gas under high pressure, by gas generated locally from a gas generating pyrotechnic material such as a sodium azide containing composition or by gas derived from the so-called hybrid or augmented gas system comprising stored compressed gas and also a gas and heat generating pyrotechnic material. In the hybrid system the generated hot gas mixes with and expands or increases the pressure of the stored compressed gas. Consequently, the amount of gas required to be stored is substantially less than in systems relying only on stored gas and the gas storage pressure and/or the overall size of the inflator is generally substantially reduced. Moreover, although the hybrid system is bulkier than the system using only a pyrotechnic material, it is often preferred as it produces less solids and noxious gases in the gas mixture supplied to the bag.

Typical hybrid inflators are described in United Kingdom patent specification no. 1408530 and in U.S. Pat. Nos. 4,131,300; 5,022,674; 5,031,932 and 5,033,772.

In hybrid inflators used hitherto the pyrotechnic hot gas generating composition is contained in a separate pressure vessel which is usually placed within the pressure vessel containing the stored pressurised gas and both containers are arranged to deliver gas to a mixing zone before the mixed inflation gases pass into the bag. This arrangement of apparatus is complicated, requires accurately constructed flow control devices and is expensive. A further disadvantage of a hybrid inflator is the relatively large particle size of the solid products from the pyrotechnic composition which products can cause blockage of gas delivery passages and are relatively inefficient in transferring heat to the stored gas.

SUMMARY OF THE INVENTION

An object of this invention is to provide a hybrid inflator which is simpler and cheaper to construct than those employed hitherto. A further object is to provide a hybrid inflator wherein the efficiency of heat transfer from the pyrotechnic material to the stored gas is substantially improved.

In accordance with this invention a hybrid inflator for a vehicle occupant restraint gas bag comprises a stored supply of gas under pressure in a gas storage vessel having a sealed exit leading to the gas bag; a heat generating pyrotechnic material effective to heat and expand the said stored gas; initiation means to ignite the pyrotechnic material and means to open the sealed exit, characterised in that the said heat energy pyrotechnic material comprises pyrotechnic material in sheet form, which, on combustion, gives substantially free from permanent gases.

The selected pyrotechnic material may be located separately from the vessel containing the stored gas and the hot products of the pyrotechnic material mixed with the stored gas in a mixing zone before delivery to the restraint bag. However, it is convenient, and generally preferred, that the pyrotechnic material be located inside the gas storage vessel and preferably in a thin container or in direct contact with the stored gas. Such an arrangement is possible as the sheeted pyrotechnic material is unaffected by the stored gas and withstands the high gas pressure.

The sheeted pyrotechnic material may be in flat form, for example, one or more flat strips or discs which may be maintained in spaced relationship to facilitate rapid combustion. Alternatively the sheet may be folded, wrinkled, pleated, corrugated, fluted or wrapped into any convenient shape for disposal inside the pressure vessel.

Advantageously, the pyrotechnic sheet: may be wrapped around a central rigid former for example a solid rod or a solid, perforated or mesh tube. The sheet may optionally be wrapped around a charge of pyrotechnic material such as a sodium azide composition or the former may contain such a charge. The sheet may be wrapped as a single or multiple wrap applied, for example, as a spirally or helically wrapped film. The wrapped sheet may advantageously be slit through at one or more positions to provide venting passages. The wrapped sheet may optionally be placed inside a perforated tubular housing. The use of a former prevents collapse of the pyrotechnic sheet under the initial ignition impulse from the igniter thereby ensuring that the pyrotechnic material is presented to the igniter in a suitable manner for obtaining efficient ignition.

The stored gas is preferably an inert gas, for example argon, which may advantageously contain a small percentage, for example 1-2% of helium to facilitate leak testing. The gas may conveniently be stored at a pressure of about 3000 psi and the volume of gas may conveniently be from 0.1 to 2.0 liters.

The sheeted pyrotechnic material may comprise a carrier sheet coated with a layer of pyrotechnic material, a specially preferred pyrotechnic material comprising a substrate of an oxidizing polymeric film having a layer of oxidizable material on at least a portion of at least one surface, the polymeric film and the oxidizable material being conjointly capably of reacting together exothermically on ignition. Preferably the polymeric film is coated on both sides with oxidizable material.

A particularly preferred pyrotechnic film layer is described in PCT International Publications Nos. WO 90/10611 and WO 90/10724. The oxidizing polymeric film described therein contains atoms chemically bound therein selected from the group consisting of halogens (especially fluorine), oxygen, sulphur, nitrogen and phosphorous. One preferred film layer is made from fluoropolymer such as polytetrafluoro-ethylene (PTFE) which produces high energy pyrotechnic films, but other suitable polymeric films include those made from polyhexafluoropropylene, copolymers of vinylidene fluoride and hexafluoropropylene, copolymers of tetrafluoroethylene and perfluropropylene, copolymers of chlorotrifluoroethylene and vinylidene fluoride, homopolymers of perfluoropropylene and its copolymers with vinylidene fluoride, and mixtures of two or more of such polymers with each other or with PTFE.

The oxidizable material is advantageously vapour-deposited on the film layer and may suitably comprise a metal selected from the group consisting of lithium, sodium, magnesium, beryllium, calcium, strontium, barium, aluminium, titanium, zirconium, and alloys thereof. A most preferred metal is magnesium or an alloy thereof preferably coated on to a fluoropolymer substrate. Preferably the ratio of metal to the substrate of oxidising polymeric film is substantially stoichiometric or there is a small excess of metal at the location of the film underlying the metal. A typical pyrotechnic film comprises a film of polytetrafluoroethylene 3 to 50 microns, (typically 10-50 microns) thick, having vapour-deposited on each side a layer of magnesium 2 to 40 microns (typically 10 microns) thick. In this instance the reaction equation is

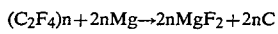

$$(C_2F_4)n + 2nMg \rightarrow 2nMgF_2 + 2nC$$

This reaction releases 5.98 Megajoules/kilogram of reactant material.

The rate of energy release varies inversely with the thickness of the pyrotechnic film and, acordingly, the thickness may be chosen to attain the desired energy release rate. The charge of pyrotechnic material may conveniently be from 2 to 50 grams.

The initiation means to ignite the pyrotechnic material may be, for example, a squib, an exploding bridge wire, a semi-conductor bridge, a spark discharge, an electric current or a hot wire. The initiation means may be arranged to be actuated in response to a collision involving a vehicle containing the inflator. Once initiated, the pyrotechnic film reacts rapidly to generate hot products which heat and expand the stored gas.

The gas exit from the pressure vessel is conveniently sealed by a frangible element such as a bursting disc or septum. Optionally the frangible element may be burst by bursting means such as an electric squib fired in response to the vehicle collision and independently of the ignition of the pyrotechnic material, in which case the pressurised gas may be partially released before, or simultaneously with, the ignition of the pyrotechnic material. However it is generally convenient for the frangible element to be burst simultaneously with or in response to the ignition of the pyrotechnic material by operation of the initiation means on collision of the vehicle. The frangible element may be arranged to burst on the attainment of predetermined conditions of pressure and heat inside the gas storage vessel. In this embodiment the bursting of the frangible element may be effected or facilitated by means of an adjacent heat-sensitive detonator.

Alternatively a projectile propelled by the burning of the pyrotechnic material or by the impulse of the initiation means may be driven directly against the frangible element to rupture the element, or the projectile may be driven against a percussion detonation such as an impact sensitive or stab-sensitive detonator which is arranged, on actuation by the projectile, to rupture the frangible element.

From a further aspect the invention consists in the use of a heat generating pyrotechnic material in sheet form as the heat generating material in a heating element for a hybrid inflator for a gas bag.

The use of pyrotechnic sheet as the heat generator in a hybrid inflator for vehicle occupant restraint systems allows the inflator construction to be simplified without sacrificing reliability. There is no longer any need to have a second pressure vessel to contain the pyrotechnic material, nor is there any need for sophisticated flow control devices or mixing chambers. The sheeted pyrotechnic material produces solid products of very small particle size which transfer their thermal energy very efficiently to the stored gas. Moreover the violence of the initial energy release from the pyrotechnic material gives more efficient pressure vessel opening than any pyrotechnic material or propellant used hitherto in occupant restraint systems and thus allows the construction of the pressure vessel closures to be simplified.

BRIEF DESCRIPTION OF THE DRAWINGS

The invention will now be described by way of example only with reference to the accompanying drawings wherein FIGS. 1-4 each show in longitudinal medial section an illustrative schematic diagram of an alternative embodiment of the invention.

DESCRIPTION OF THE PREFERRED EMBODIMENTS

Figure 5:
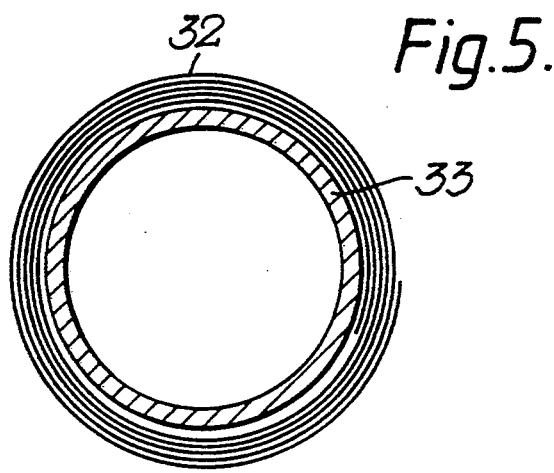
FIGS. 5-7 show diagramatically in cross section alternative constructions of pyrotechnic charges usable in the embodiments shown in FIGS. 1-4.

Referring to FIG. 1, an inflator designated generally 10 includes a mild steel pressure vessel 11 containing a spirally wrapped charge of pyrotechnic sheet material 12 (heating element) located between two perforated spacer members 13, 14. The wrapped pyrotechnic element 12 is slit through with a longitudinal slit 15 to facilitate gas flow on ignition of the pyrotechnic material. A metal cased ignitor squib 16 is sealed by welding into an end 17 of the vessel 11, the squib including conductor leads 18 for connection to activator means (not shown), the leads 18 being sealed into the squib in known manner by means of a glass to metal seal. A filter element 19 of porous inert material is located in a portion of the vessel 11 at the end 20 opposite to the end 17. The end 20 has an exit opening 21 sealed with a stainless steel seating element 22, welded to the vessel 11 at the end 20, the element 22 having an aperture 23 sealed with a bursting disc 24 welded thereto. The vessel 11 conveniently has a capacity of 0.1-2 liters and is filled with an inert gas conveniently 98% argon and 2% helium by volume at a pressure of about 3000 psi. The element 17 conveniently comprises about 6 to 25 grams of pyrotechnic sheet.

In operation, on collision of a vehicle containing the inflator 10, current is passed through conductor leads 18 to fire the squib 16, which in turn ignites the pyrotechnic element 12. The heat generated by the element 12 heats and increases the pressure of the inert gas in vessel 11 until at predetermined conditions of pressure and heat, dependent on the characteristics of the bursting disc 24, the bursting disc 24 bursts to allow the gas to flow through the aperture 23 and the vessel exit 21 to inflate a gas bag (not shown) of a safety restraint system.

In the embodiment shown in FIG. 2, an inflator designated generally 30 includes a mild steel pressure vessel 31 which is filled with inert gas at a pressure of about 3000 psi. The vessel 31 contains a spirally wrapped charge of pyrotechnic sheet material 32 wrapped on a central former 33 and encased in a relatively light metal casing 34. One end 35 of casing 34 is fixed in an aperture 36 formed in an end 37 of vessel 31. An electric ignitor squib 38, is welded into the end 35 of casing 34 and is sealed into and retained in aperture 36 by a retaining ring 39 which is welded to the vessel 31 and to the metal case of the squib 38. The squib 38 has conductor leads 40 for connection to activation means (not shown). The other end 41 of the casing 34 is located centrally in the vessel 31 by a spider element 42. The end of casing 34 has an external circumferential groove 43 formed therein which defines a tapered or pointed end portion 44 which breaks away from the end 35 of the casing 34 when the charge 32 is ignited and the pressure in the casing 34 exceeds a predetermined value. The portion 44 is centred in the vessel 31 by a centering guide element 60 which maintains the axial alignment of the portion 44 after it is broken away from the end 35. The second end 45 of the vessel 31 has an exit opening 46 and contains a sealing element 47 at a position which leaves a plenum chamber 48 between the sealing element 47 and the exit opening 45 in which the inflation gases expand before flowing through the opening 46 to a gas bag (not shown).

A porous inert filter element 49 obturates the opening 46 and is retained in position by an annular spacer element 50. The sealing element 47 is a metal annular member which is peripherally welded to the vessel 31 and has a central aperture 51 which is sealed by a thin stainless steel frangible disc 52.

In operation, on collision of a vehicle containing the inflator 30, current passes through the leads 40 to fire the squib 38 which, in turn, ignites the pyrotechnic charge 32. The end portion 44 of the casing 34 breaks away at the groove 43 and is projected against and penetrates the frangible disc 52. The disc immediately ruptures and the inert gas which is heated and expanded by the burning of charge 32 flows through the aperture 51, filter 49 and the exit opening 46 to inflate a gas bag.

The embodiment shown in FIG. 3 is a modification of the embodiment shown in FIG. 2 but having an impact-sensitive detonator 53 in contact with the frangible disc 52, the sealing element 47 being modified to accommodate the disc 52 and the detonator 53.

In operation on ignition of the pyrotechnic charge 32, the pointed end portion 44 of the casing 34 breaks away at the groove 43 and is projected against and initiates the detonator 53. The detonation of detonator 53 immediately bursts the frangible disc 52 and allows the inert gas, which has been heated by the burning of the pyrotechnic charge 32, to flow through the aperture 51, filter 49 and exit opening 46 to inflate a gas bag.

The embodiment shown in FIG. 4, is a modification of the embodiment shown in FIG. 3, but the detonator 53 is stab-sensitive instead of impact sensitive. In this embodiment the casing 34 is omitted, the central former 33 is hollow and an axially movable element 54 is axially disposed within the former 33. One end of the element 54 is located adjacent to the squib 38 and arranged so that on ignition of the squib the element 54 is propelled axially through the former 33 by the impulse of the ignition, the flame from the squib 38 simultaneously igniting the pyrotechnic material 32. The other end of the element 54 has a needle point 55 which is axially spaced from detonator 53 but, on ignition of the squib 38, penetrates the detonator 53 to effect bursting of the frangible disc 52 and consequent release of the heated gases to inflate a gas bag.

Figure 6:
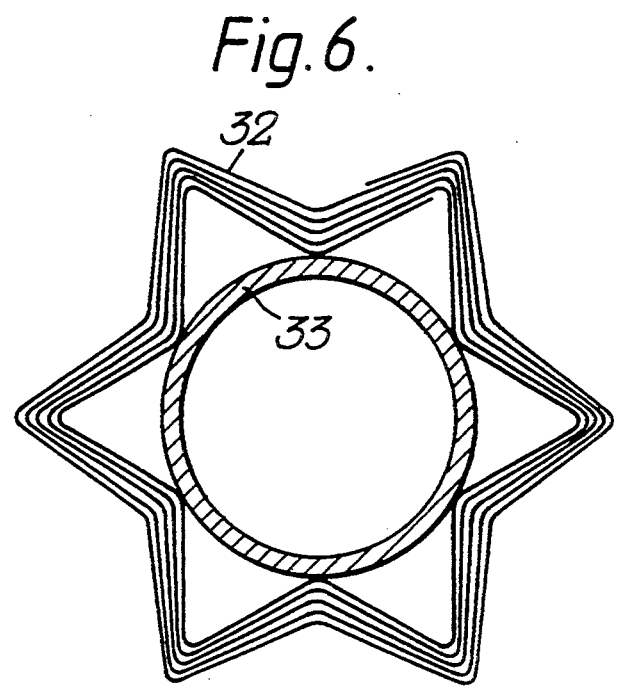
Figure 7:
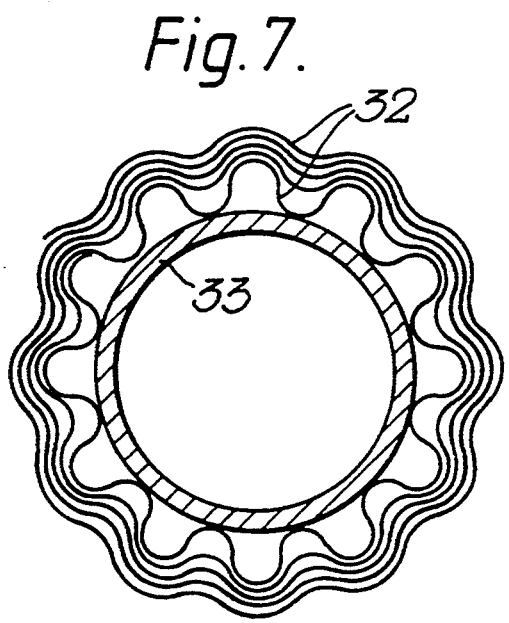

In the illustrations of the alternative pyrotechnic charges shown in FIGS. 5 to 7, the pyrotechnic sheet 32 material is wrapped in generally spiral fashion around a central former 33.

The pyrotechnic sheet 32 of FIG. 5 is a flat sheet with the coils being loosely wound or spaced apart. In FIG. 6 the sheeted pyrotechnic material is a fluted sheet and in FIG. 7 it is a corrugated sheet.

We claim:

1. A hybrid inflator for a gas bag for a vehicle occupant restraint safety system comprising:
 a gas storage vessel having a sealed exit;
 a supply of gas stored under pressure in said vessel;
 a pyrotechnic material effective to heat and expand said supply of gas;
 initiation means to ignite said pyrotechnic material to heat the supply of gas; and
 means to open said sealed exit to permit heated gas to flow through said exit to a gas bag when the bag is required to be inflated;
 wherein said heat generating material comprises pyrotechnic material in sheet form, which on combustion gives products substantially in solid form.

2. An inflator as claimed in claim 1 wherein said pyrotechnic sheet material is located inside said gas storage vessel.

3. An inflator as claimed in claim 1 wherein said pyrotechnic sheet material is located in direct contact with stored gas.

4. An inflator as claimed in claim 1 wherein said pyrotechnic sheet material is selected from the group consisting of folded, wrinkled, pleated, corrugated and fluted sheet material.

5. An inflator as claimed in claim 1 wherein the pyrotechnic sheet material comprises a substrate of oxidizing polymeric film having a layer of oxidizable material on at least a portion of at least one surface thereof, the polymeric film and the oxidizable material being conjointly capable of reacting together exothermically on ignition.

6. An inflator as claimed in claim 5 wherein the oxidizing polymeric film contains chemically bound atoms selected from the group consisting of halogens, oxygen, sulphur, nitrogen and phosphorous and the oxidizable material comprises a metal selected from the group consisting of lithium, sodium, magnesium, beryllium, calcium, strontium, barium, aluminium, titanium, zirconium and alloys thereof said metal being vapour-deposited on the oxidizing polymeric film.

7. An inflator as claimed in claim 6 wherein the oxidizing polymeric film comprises polymer selected from the group consisting of polytetrafluoroethylene (PTFE), polyhexafluoropropylene, copolymers of vinylidene fluoride and hexafluoropropylene, copolymers of tetrafluoroethylene and perfluoropropylene, copolymers of chlorotrifluoroethylene and vinylidene fluoride, homopolymers of perfluoropropylene and its copolymers with vinylidene fluoride, and mixtures of two or more of such polymers with each other or with PTFE.

8. An inflator as claimed in claim 7 wherein the oxidizing polymeric film comprises polymer film 3 to 50 microns thick having vapour-deposited thereon a layer of magnesium 2 to 40 microns thick.

9. An inflator as claimed in claim 1 comprising a frangible disc sealing said gas storage vessel exit;
 a percussion detonator arranged on actuation to rupture said frangible disc; and
 a projectile arranged to be propelled against and actuate said detonator by an impulse selected from the group consisting of the impulse of the initiation means and the impulse from the burning of the pyrotechnic material.

10. A heating element for a hybrid inflator as claimed in claim 1, comprising, as heat-generating material, pyrotechnic sheet material comprising a substrate of oxidizing polymeric film having oxidizable material on at least a portion of one surface thereof, the polymeric material and the oxidizing material being conjointly capable of reacting together exothermically on ignition.

* * * * *